(12) United States Patent
Wang et al.

(10) Patent No.: US 12,463,685 B2
(45) Date of Patent: Nov. 4, 2025

(54) RELAYING BEAM SWITCHING INFORMATION

(71) Applicant: QUALCOMM Incorporated, San Diego, CA (US)

(72) Inventors: Hua Wang, Basking Ridge, NJ (US); Sony Akkarakaran, Poway, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 376 days.

(21) Appl. No.: 18/182,043

(22) Filed: Mar. 10, 2023

(65) Prior Publication Data

US 2024/0305337 A1 Sep. 12, 2024

(51) Int. Cl.
*H04B 7/0408* (2017.01)
*H04B 7/0404* (2017.01)
*H04W 88/04* (2009.01)

(52) U.S. Cl.
CPC ......... *H04B 7/0408* (2013.01); *H04B 7/0404* (2013.01); *H04W 88/04* (2013.01)

(58) Field of Classification Search
CPC .... H04B 7/0695; H04B 7/088; H04B 7/0408; H04B 7/0404; H04W 88/04
See application file for complete search history.

(56) References Cited

U.S. PATENT DOCUMENTS

| | | | |
|---|---|---|---|
| 2019/0200337 A1* | 6/2019 | Zhou | H04L 5/0055 |
| 2024/0259923 A1* | 8/2024 | Soni | H04W 76/14 |
| 2024/0267113 A1* | 8/2024 | Dees | H04W 88/06 |
| 2024/0397357 A1* | 11/2024 | Wang | H04W 36/033 |
| 2025/0097958 A1* | 3/2025 | Khoryaev | H04W 72/02 |

* cited by examiner

*Primary Examiner* — Angelica Perez
(74) *Attorney, Agent, or Firm* — Harrity & Harrity, LLP

(57) ABSTRACT

Various aspects of the present disclosure generally relate to wireless communication. In some aspects, a relay user equipment (UE) may receive, from a network node, a first message, the first message indicating beam switching information for a target UE. The relay UE may transmit, to the target UE, a second message based at least in part on the first message, the second message indicating the beam switching information for the target UE. The relay UE may receive, from the target UE, an acknowledgement (ACK) associated with a receipt of the second message. Numerous other aspects are described.

30 Claims, 13 Drawing Sheets

RELAYING BEAM SWITCHING INFORMATION

FIELD OF THE DISCLOSURE

Aspects of the present disclosure generally relate to wireless communication and to techniques and apparatuses for relaying beam switching information.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a relay user equipment (UE) includes a memory and one or more processors, coupled to the memory, configured to: receive, from a network node, a first message, the first message indicating beam switching information for a target UE; transmit, to the target UE, a second message based at least in part on the first message, the second message indicating the beam switching information for the target UE; and receive, from the target UE, an acknowledgement (ACK) associated with a receipt of the second message.

In some implementations, an apparatus for wireless communication at a target UE includes a memory and one or more processors, coupled to the memory, configured to: receive, from a relay UE, a second message that indicates beam switching information for the target UE, the second message being associated with a first message between the relay UE and a network node that indicates the beam switching information for the target UE; transmit, to the relay UE, an ACK associated with a receipt of the second message; and receive, from the network node, a downlink transmission based at least in part on the beam switching information.

In some implementations, a method of wireless communication performed by a relay UE includes receiving, from a network node, a first message, the first message indicating beam switching information for a target UE; transmitting, to the target UE, a second message based at least in part on the first message, the second message indicating the beam switching information for the target UE; and receiving, from the target UE, an ACK associated with a receipt of the second message.

In some implementations, a method of wireless communication performed by a target UE includes receiving, from a relay UE, a second message that indicates beam switching information for the target UE, the second message being associated with a first message between the relay UE and a network node that indicates the beam switching information for the target UE; transmitting, to the relay UE, an ACK associated with a receipt of the second message; and receiving, from the network node, a downlink transmission based at least in part on the beam switching information.

In some implementations, a non-transitory computer-readable medium storing a set of instructions for wireless communication includes one or more instructions that, when executed by one or more processors of a relay UE, cause the relay UE to: receive, from a network node, a first message, the first message indicating beam switching information for a target UE; transmit, to the target UE, a second message based at least in part on the first message, the second message indicating the beam switching information for the target UE; and receive, from the target UE, an ACK associated with a receipt of the second message.

In some implementations, a non-transitory computer-readable medium storing a set of instructions for wireless communication includes one or more instructions that, when executed by one or more processors of a target UE, cause the target UE to: receive, from a relay UE, a second message that indicates beam switching information for the target UE, the second message being associated with a first message between the relay UE and a network node that indicates the beam switching information for the target UE; transmit, to the relay UE, an ACK associated with a receipt of the second message; and receive, from the network node, a downlink transmission based at least in part on the beam switching information.

In some implementations, a relay apparatus for wireless communication includes means for receiving, from a network node, a first message, the first message indicating beam switching information for a target apparatus; means for transmitting, to the target apparatus, a second message based at least in part on the first message, the second message indicating the beam switching information for the target apparatus; and means for receiving, from the target apparatus, an ACK associated with a receipt of the second message.

In some implementations, a target apparatus for wireless communication includes means for receiving, from a relay apparatus, a second message that indicates beam switching information for the target apparatus, the second message being associated with a first message between the relay apparatus and a network node that indicates the beam switching information for the target apparatus; means for transmitting, to the relay apparatus, an ACK associated with a receipt of the second message; and means for receiving, from the network node, a downlink transmission based at least in part on the beam switching information.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
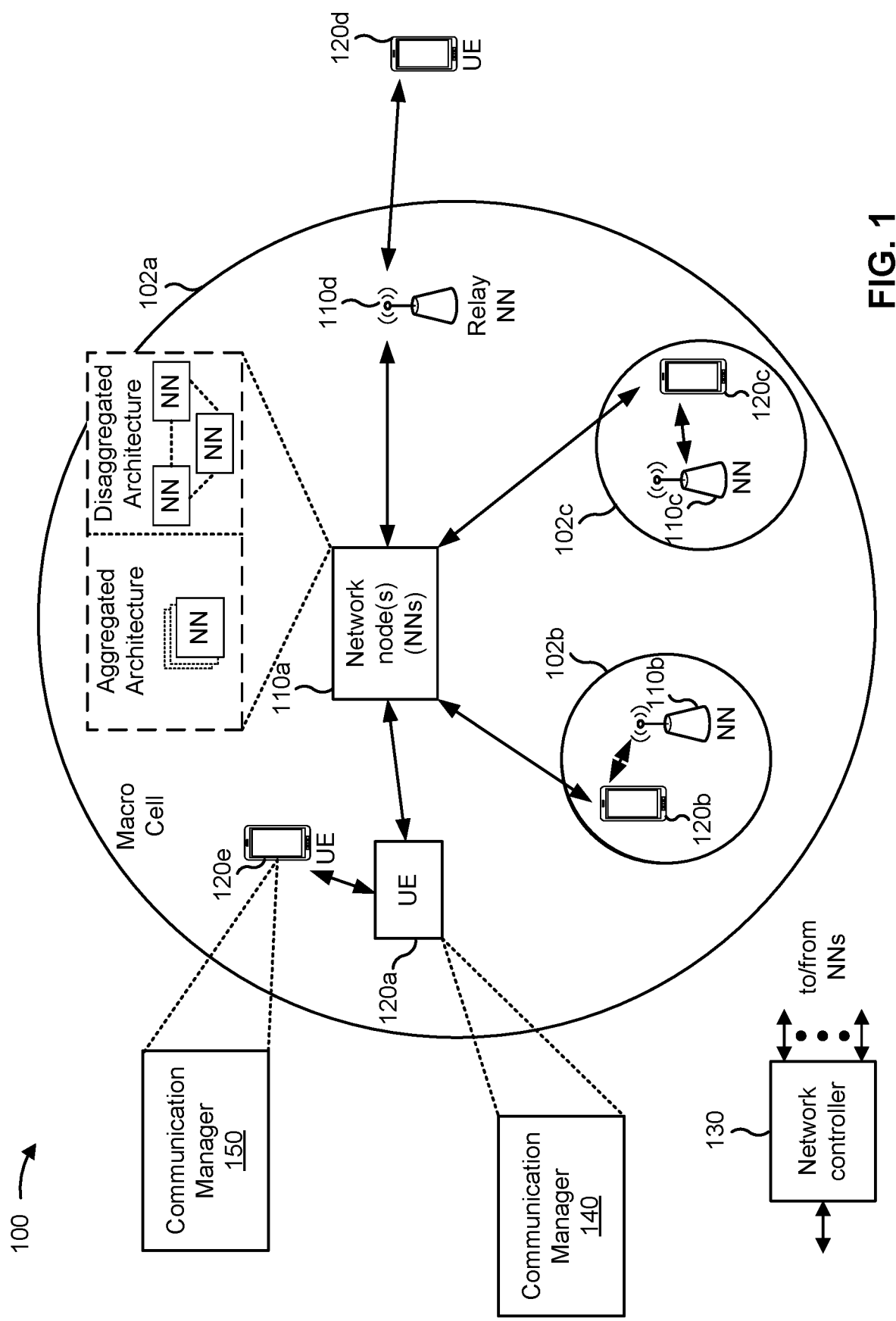
FIG. 1 is a diagram illustrating an example of a wireless network, in accordance with the present disclosure.

A network node may transmit beam switching information to a target UE. The beam switching information may indicate a command for beam switching (e.g., a beam switch command). The beam switching information may include a Uu beam indication based at least in part on a Uu link between the network node and the target UE. The target UE may perform a beam switch based at least in part on the beam switching information received from the network node. In some cases, when the Uu link (e.g., a Uu downlink link) between the network node and the target UE fails or is of relatively poor quality, the network node may need to repeatedly transmit the beam switching information, so that the beam switching information is successfully received by the target UE. The beam switching information may take multiple retransmissions to be successfully received by the target UE, which may degrade an overall performance of the target UE and/or the network node.

In some aspects described herein, a relay UE may receive, from a network node, a first message. The first message may indicate beam switching information for a target UE. The beam switching information may indicate a new beam for the target UE. The relay UE may transmit, to the target UE, a second message based at least in part on the first message. The second message may indicate the beam switching information for the target UE. The relay UE may receive, from the target UE, an acknowledgement (ACK) associated with a receipt of the second message. The relay UE may relay, to the network node, the ACK associated with the receipt of the second message.

In some aspects described herein, the relay UE may be for a link between the network node and the target UE. The relay UE may relay the beam switching information from the network node to the target UE when the link between the network node and the target UE fails or is associated with a relatively poor quality. The relay UE may relay the beam switching information to the target UE via a sidelink interface between the relay UE and the target UE. The target UE may switch to the new beam based at least in part on the beam switching information. When the relay UE is used to relay the beam switching information, the target UE does not need to wait for a beam failure recovery process to reestablish a downlink beam, thereby improving a performance of the target UE.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF)

band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a relay UE (e.g., UE 120a) may include a communication manager 140. As described in more detail elsewhere herein, the communication manager 140 may receive, from a network node, a first message, the first message indicating beam switching information for a target UE; transmit, to the target UE, a second message based at least in part on the first message, the second message indicating the beam switching information for the target UE; and receive, from the target UE, an ACK associated with a receipt of the second message. Additionally, or alternatively, the communication manager 140 may perform one or more other operations described herein.

In some aspects, a target UE (e.g., UE 120e) may include a communication manager 150. As described in more detail elsewhere herein, the communication manager 150 may receive, from a relay UE, a second message that indicates beam switching information for the target UE, the second message being associated with a first message between the relay UE and a network node that indicates the beam switching information for the target UE; transmit, to the relay UE, an ACK associated with a receipt of the second message; and receive, from the network node, a downlink transmission based at least in part on the beam switching information. Additionally, or alternatively, the communication manager 150may perform one or more other operations described herein.

As indicated above, FIG. 1 is provided as an example. Other examples may differ from what is described with regard to FIG. 1.

Figure 2:
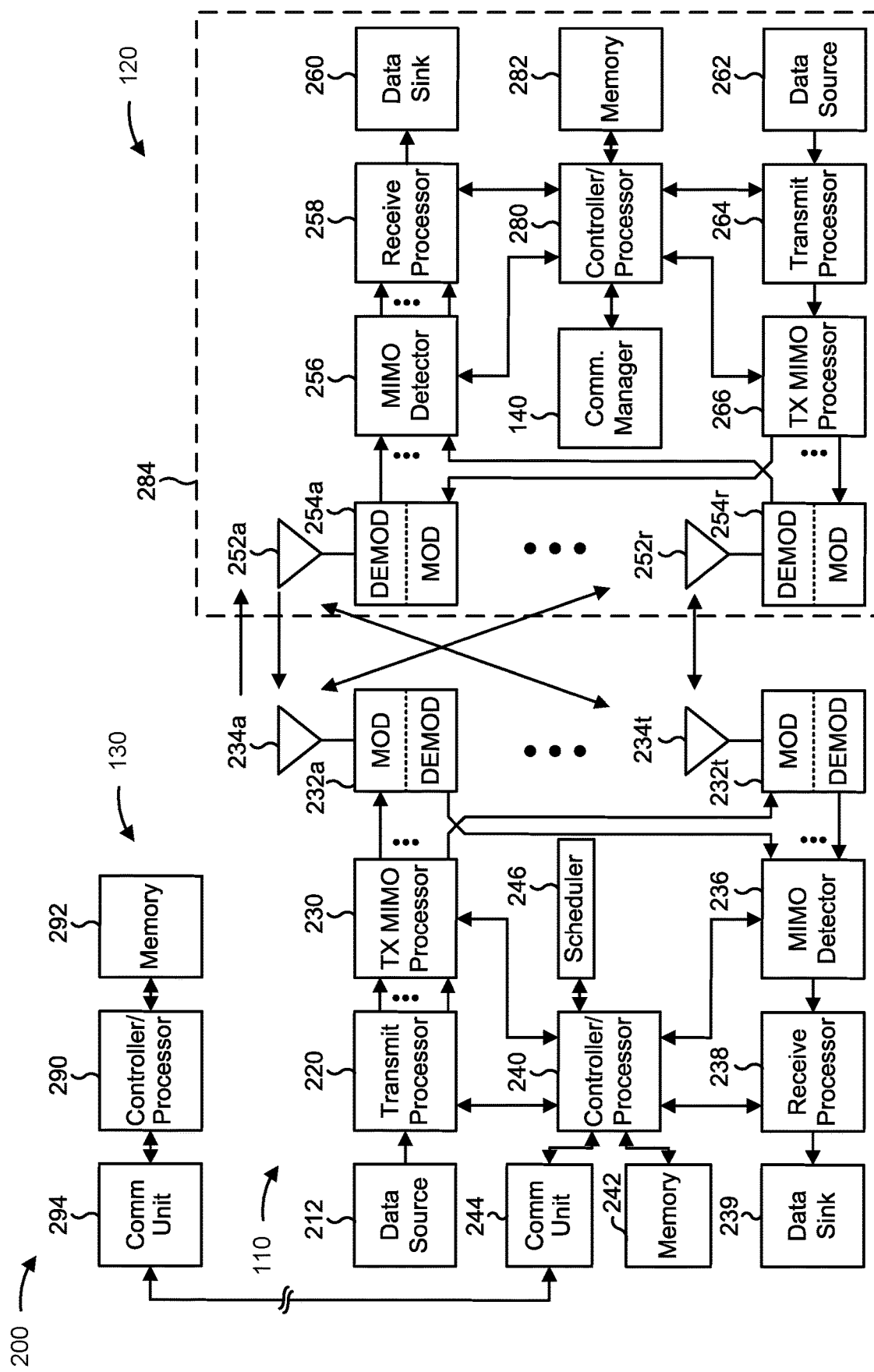
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-13).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-13).

The controller/processor 240 of the network node 110, the controller/processor 280 of the UE 120, and/or any other component(s) of FIG. 2 may perform one or more techniques associated with relaying beam switching information, as described in more detail elsewhere herein. For example, the controller/processor 240 of the network node 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, a relay UE (e.g., UE 120a) includes means for receiving, from a network node, a first message, the first message indicating beam switching information for a target UE; means for transmitting, to the target UE, a second message based at least in part on the first message, the second message indicating the beam switching information for the target UE; and/or means for receiving, from the target UE, an ACK associated with a receipt of the second message. The means for the relay user UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a target UE (e.g., UE 120e) includes means for receiving, from a relay UE, a second message that indicates beam switching information for the target UE, the second message being associated with a first message between the relay UE and a network node that indicates the beam switching information for the target UE; means for transmitting, to the relay UE, an ACK associated with a receipt of the second message; and/or means for receiving, from the network node, a downlink transmission based at least in part on the beam switching information. The means for the target UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
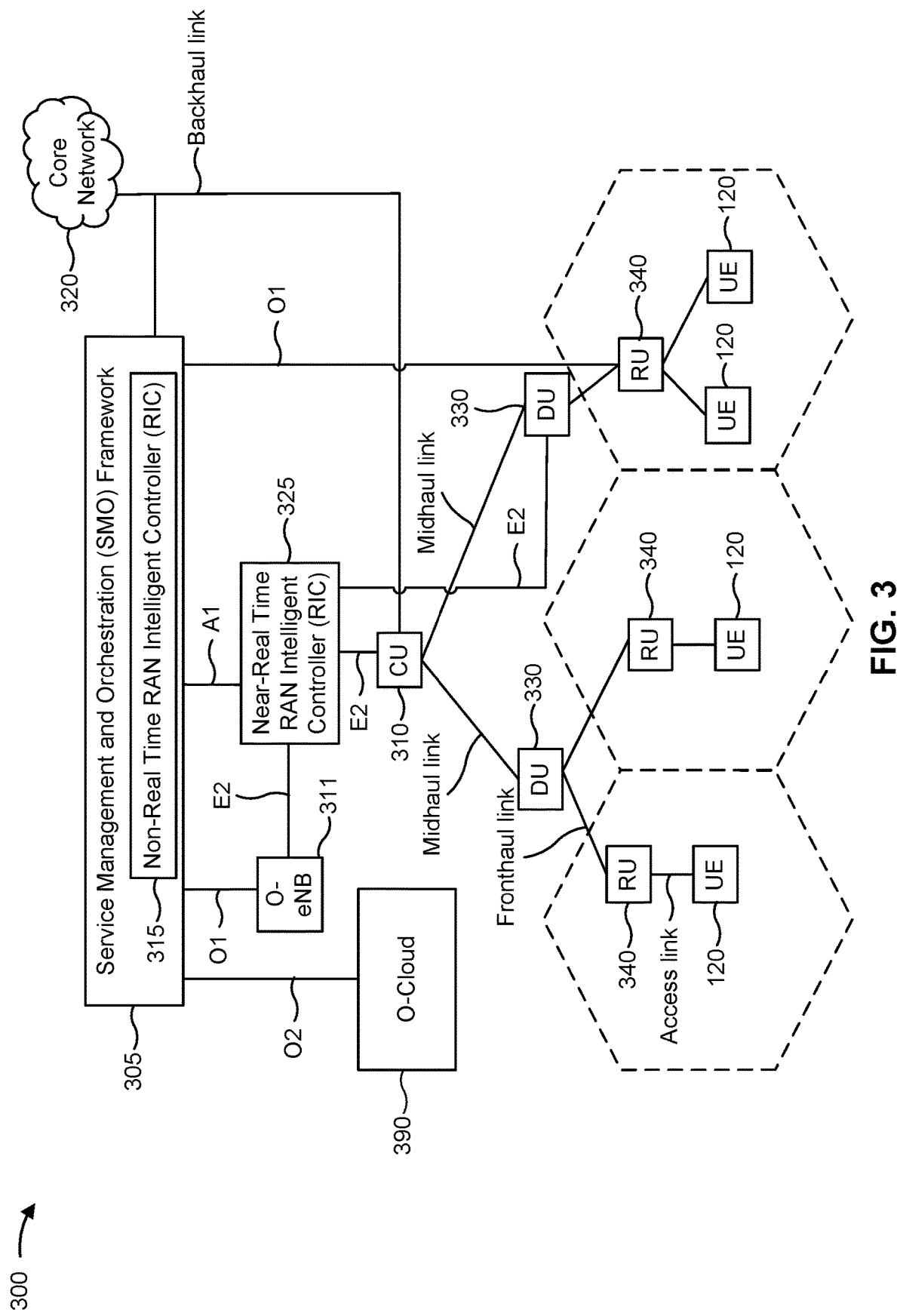
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces.

Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

A network node may transmit beam switching information to a target UE. The beam switching information may indicate a transmission configuration indicator (TCI) command for beam switching (e.g., a beam switch command). The beam switching information may include a Uu beam indication based at least in part on a Uu link between the network node and the target UE. The network node may transmit the beam switching information using a MAC control element (MAC-CE) or downlink control information (DCI). The target UE may perform a beam switch based at least in part on the beam switching information received from the network node.

In some cases, when the Uu link (e.g., a Uu downlink link) between the network node and the target UE fails or is of relatively poor quality, the network node may need to repeatedly transmit the beam switching information, so that the beam switching information is successfully received by the target UE. The beam switching information may take multiple retransmissions to be successfully received by the target UE, which may degrade an overall performance of the target UE and/or the network node.

In various aspects of techniques and apparatuses described herein, a relay UE may receive, from a network node, a first message. The first message may indicate beam switching information for a target UE. The relay UE may transmit, to the target UE, a second message based at least in part on the first message. The second message may indicate the beam switching information for the target UE. The relay UE may receive, from the target UE, an ACK associated with a receipt of the second message. The relay UE may relay, to the network node, the ACK associated with the receipt of the second message.

In some aspects, the relay UE may be for a link between the network node and the target UE. The relay UE may relay the beam switching information (e.g., a beam switch command or a TCI command for beam switching) from the network node to the target UE when the link between the network node and the target UE fails or is associated with a relatively poor quality. The relay UE may relay the beam switching information to the target UE via a sidelink interface between the relay UE and the target UE. The beam switching information may indicate a beam switch, where the beam switch may be for a downlink beam and/or an uplink beam. The beam switching information may indicate a new beam for the target UE, and the target UE may switch to the new beam based at least in part on the beam switching information. The information regarding the new beam may be based at least in part on a network node measurement of different sounding reference signal (SRS) beams, or may be based at least in part on an AI/ML algorithm used to predict candidate beams. When the relay UE is used to relay the beam switching information, the target UE does not need to wait for a beam failure recovery process to reestablish a downlink beam, thereby improving a performance of the target UE.

Figure 4:
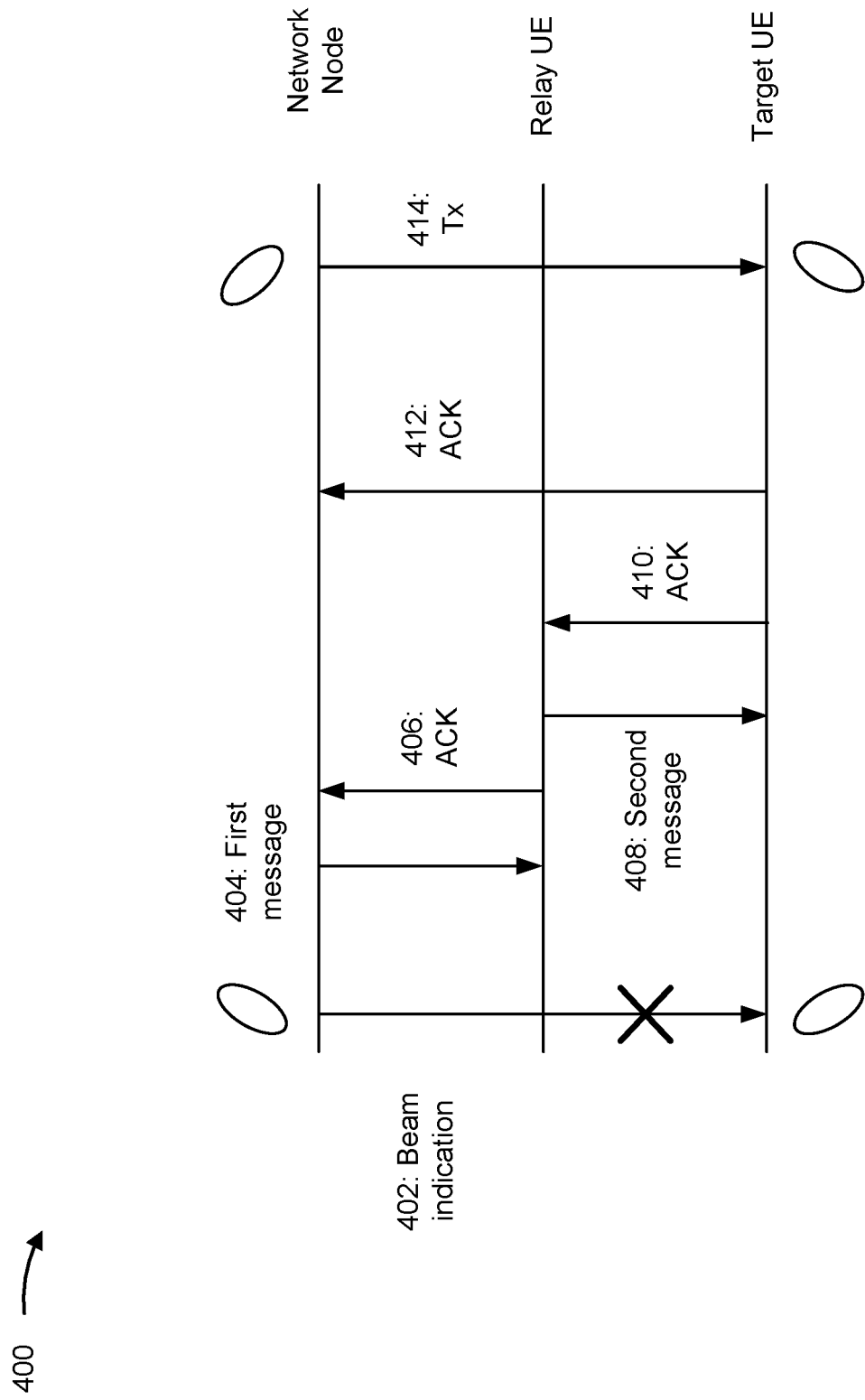
FIGS. 4-9 are diagrams illustrating examples associated with relaying beam switching information, in accordance with the present disclosure.

FIG. 4 is a diagram illustrating an example 400 associated with relaying beam switching information, in accordance with the present disclosure. As shown in FIG. 4, example 400 includes communication between a relay UE (e.g., UE 120*a*), a target UE (e.g., UE 120*e*), and a network node (e.g., network node 110). In some aspects, the relay UE, the target UE, and the network node may be included in a wireless network, such as wireless network 100.

As shown by reference number 402, the network node may attempt to transmit beam switching information directly to the target UE. The beam switching information may indicate a beam switch command or a TCI command for beam switching. However, the target UE may fail to successfully receive the beam switching information due to a failed downlink link between the network node and the target UE, or a downlink link between the network node and the target UE that is associated with a relatively poor quality. As shown by reference number 404, in a first step, the network node may transmit a first message to the relay UE. The first message may indicate the beam switching information for the target UE. The beam switching information may indicate the beam switch command or the TCI command for beam switching for the target UE. The network node may transmit the first message using a MAC-CE or DCI. As shown by reference number 406, the relay UE may transmit, to the network node, an ACK based at least in part on the first message being successfully received by the relay UE. As shown by reference number 408, in a second step, the relay UE may transmit a second message to the target UE. The second message may indicate the beam switching information for the target UE. The relay UE may transmit the second message using a sidelink MAC-CE or a sidelink control information (SCI). In other words, the relay UE may forward the beam switching information received from the network node to the target UE.

As shown by reference number 410, in a third step, the target UE may transmit, to the relay UE, an ACK based at least in part on the second message being successfully received by the target UE. As shown by reference number 412, the target UE may transmit an ACK (e.g., a third step ACK) directly to the network node. For example, an uplink link between the target UE and the network node may not be failed and not associated with the relatively poor quality, so the target UE may be able to directly transmit the ACK to the network node. The ACK may indicate to the network node that the beam switching information was successfully received by the target UE. As shown by reference number 414, the network node may perform a downlink transmission to the target UE using a new beam on a Uu link, where the target UE may switch to the new beam based at least in part on the beam switching information.

In some aspects, in the first step, the network node may transmit the first message to the relay UE. The first message may indicate the beam switching information (e.g., the beam switch command or the TCI command for beam switching) for a target UE. The first network node may transmit the first message using the MAC-CE or the DCI. In the second step, the relay UE may transmit the second message to the target UE. The second message may indicate the beam switching information for the target UE. In other words, the relay UE may forward the beam switching information received from the network node to the target UE. The relay UE may transmit the second message using the sidelink MAC-CE or the SCI. In the third step, the target UE may transmit the ACK directly to the network node, or alternatively, the target UE may transmit the ACK to the network node via the relay UE. For example, the target UE may transmit the ACK to the relay UE via a sidelink interface, and the relay UE may forward the ACK to the network node. The network node and the target UE may subsequently communicate with each other using the new beam on the Uu link, where the new beam may be indicated by the beam switching information.

In some aspects, in the first step, the network node may transmit the first message to the relay UE using the MAC-CE or the DCI. The first message may indicate, via the beam switching information, a TCI command. The TCI command may be a DCI codepoint or a TCI state identifier. The TCI command may be for a downlink beam only, or the TCI command may be for both a downlink beam and an uplink beam. Since a current downlink beam has failed or is associated with a relatively poor quality, the current downlink beam may need to be switched to the new beam. The first message may indicate an uplink resource allocation for the ACK from the target UE (in the third step). The uplink resource allocation may be an uplink resource for the relay UE to forward a sidelink ACK from the target UE. The uplink resource allocation may be an uplink resource for the target UE to directly transmit the ACK to the network node.

In some aspects, the network node may use DCI for a sidelink resource allocation, which may allow the relay UE to transmit the second message. The DCI may also indicate a destination index of the target UE. The relay UE may use the sidelink resource allocation and the destination index of the target UE, as indicated in the DCI received from the network node, to transmit the second message to the target UE. In some aspects, the relay UE may transmit, to the network node, an ACK based at least in part on the first message received from the network node. In some cases, the relay UE may omit transmitting the ACK, and instead the network node may rely on a later ACK received directly from the target UE or from the target UE via the relay UE (in the third step).

In some aspects, in the second step, the relay UE may transmit the second message to the target UE. When the first message is transmitted by the network node using a Uu MAC-CE, the relay UE may generate the second message by wrapping the first message in a sidelink MAC-CE without changing a payload of the first message. The relay UE may generate the second message by encoding the payload of the first message in SCI. When the first message is transmitted by the network node using DCI, the relay UE may generate the second message by encoding the first message in a sidelink MAC-CE or SCI.

In some aspects, the relay UE may generate the second message based at least in part on the first message. The first UE may wrap the first message in a sidelink MAC-CE without changing the payload of the first message. The first UE may encode the payload of the first message in the SCI, which may be based at least in part on the first message being transmitted using the MAC-CE. Alternatively, the first UE may encode the first message in the sidelink MAC-CE or the SCI, which may be based at least in part on the first message being transmitted using the DCI.

In some aspects, an uplink resource for the relay UE to use for forwarding the sidelink ACK, which may be associated with the second message, may or may not be indicated in the second message. The target UE may be able to determine the uplink resource for the sidelink ACK, which may affect a beam switch application time.

In some aspects, in the third step, the target UE may transmit the ACK directly to the network node using an uplink resource. The uplink resource for transmitting the ACK may have been indicated in the first message, which may have also indicated a physical uplink control channel (PUCCH) resource indicator. A k parameter of the PUCCH may be related to the first message (or its corresponding ACK), or the k parameter of the PUCCH may be related to the second message (or its corresponding ACK).

In some aspects, the target UE may determine an uplink beam to use when transmitting the ACK, which may be transmitted directly to the network node, or transmitted to the relay UE, which may then forward the ACK to the network node. When the first message does not indicate a new uplink beam, the target UE may transmit the ACK using a current uplink beam, which may be applicable when the current uplink beam is working. When the first message indicates the new uplink beam, the target UE may transmit the ACK using the current uplink beam, which may be applicable when the current uplink beam is working. Alternatively, the target UE may transmit the ACK using a new uplink beam, which may be applicable when the current uplink beam is working or not working.

As indicated above, FIG. 4 is provided as an example. Other examples may differ from what is described with regard to FIG. 4.

Figure 5:
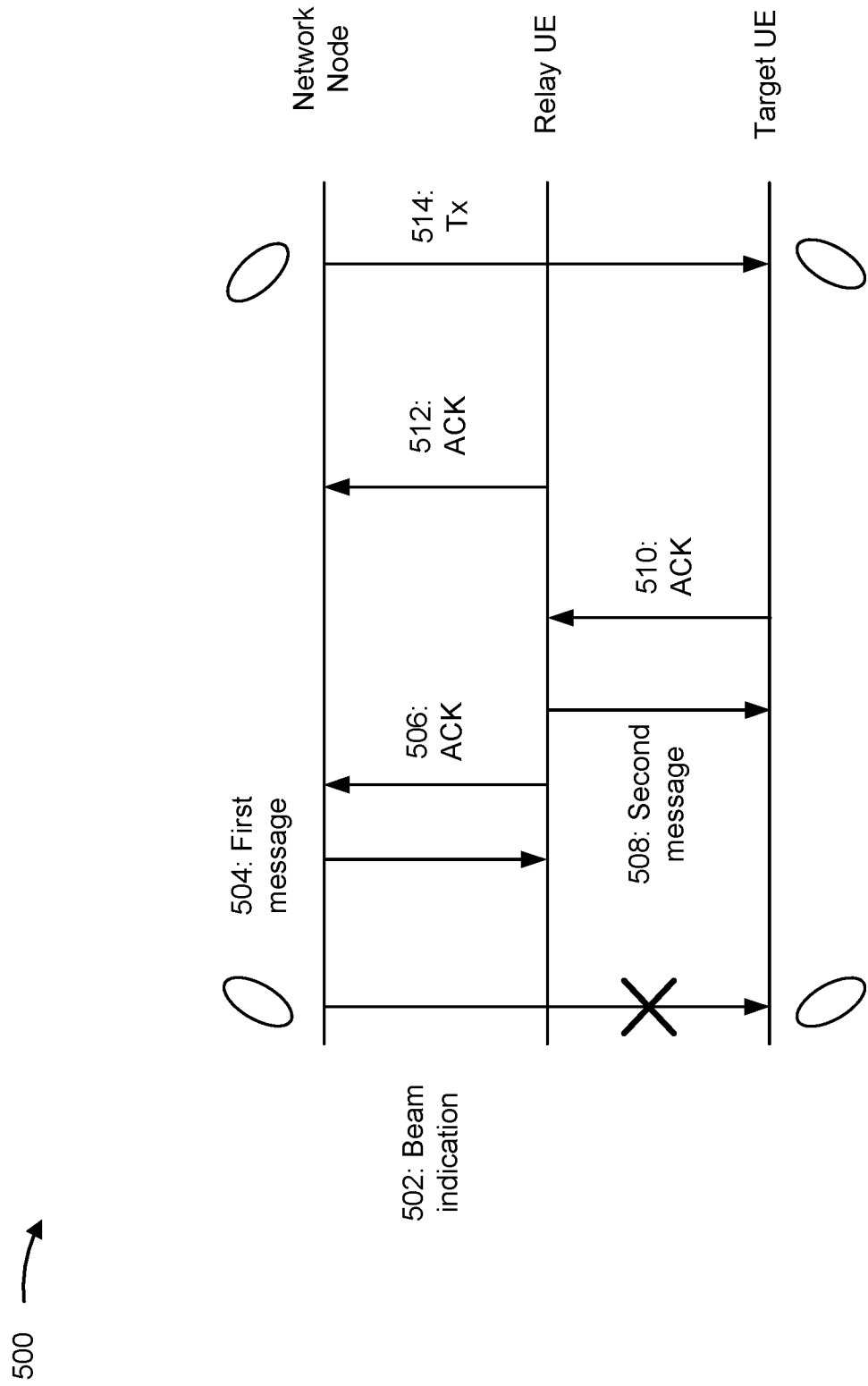

FIG. 5 is a diagram illustrating an example 500 associated with relaying beam switching information, in accordance with the present disclosure. As shown in FIG. 5, example 500 includes communication between a relay UE (e.g., UE 120a), a target UE (e.g., UE 120e), and a network node (e.g., network node 110). In some aspects, the relay UE, the target UE, and the network node may be included in a wireless network, such as wireless network 100.

As shown by reference number 502, the network node may attempt to transmit beam switching information directly to the target UE. The beam switching information may indicate a beam switch command or a TCI command for beam switching. However, the target UE may fail to successfully receive the beam switching information due to a failed downlink link between the network node and the target UE, or a downlink link between the network node and the target UE that is associated with a relatively poor quality. As shown by reference number 504, in a first step, the network node may transmit a first message to the relay UE. The first message may indicate the beam switching information for the target UE. The beam switching information may indicate the beam switch command or the TCI command for beam switching for the target UE. The network node may transmit the first message using a MAC-CE or DCI. As shown by reference number 506, the relay UE may transmit, to the network node, an ACK based at least in part on the first message being successfully received by the relay UE. As shown by reference number 508, in a second step, the relay UE may transmit a second message to the target UE. The second message may indicate the beam switching information for the target UE. The relay UE may transmit the second message using a sidelink MAC-CE or an SCI. In other words, the relay UE may forward the beam switching information received from the network node to the target UE.

As shown by reference number 510, in a third step, the target UE may transmit, to the relay UE, an ACK (e.g., a third step ACK) based at least in part on the second message being successfully received by the target UE. As shown by reference number 512, the relay UE may forward the ACK to the network node. In other words, the target UE may transmit the ACK to the network node via the relay UE. The ACK may indicate to the network node that the beam switching information was successfully received by the target UE. As shown by reference number 514, the network node may perform a downlink transmission to the target UE using a new beam on a Uu link, where the target UE may switch to the new beam based at least in part on the beam switching information.

In some aspects, in the third step, the target UE may transmit the ACK to the network node via the relay UE. An uplink resource for the relay UE to forward the sidelink ACK from the target UE, for the second message, may be indicated in the first message.

As indicated above, FIG. 5 is provided as an example. Other examples may differ from what is described with regard to FIG. 5.

In some aspects, a downlink beam may be associated with an application time. When a target UE transmits an ACK directly to a network node, an uplink resource for the ACK may be known at both the network node and the target UE, and a downlink beam switch application time may be known at both the network node and the target UE. When the target UE transmits the ACK to the network node via a relay UE, an uplink resource for forwarding the ACK from the relay UE may or may not be known to the target UE. In other words, the uplink resource that the relay UE uses for forwarding the ACK to the network node may or may not be indicated to the target UE. When the uplink resource for forwarding the ACK is indicated to the target UE, both the network node and the target UE may determine when the network node will receive the ACK, and the downlink beam switch application time may be known at both the network node and the target UE.

Figure 6:
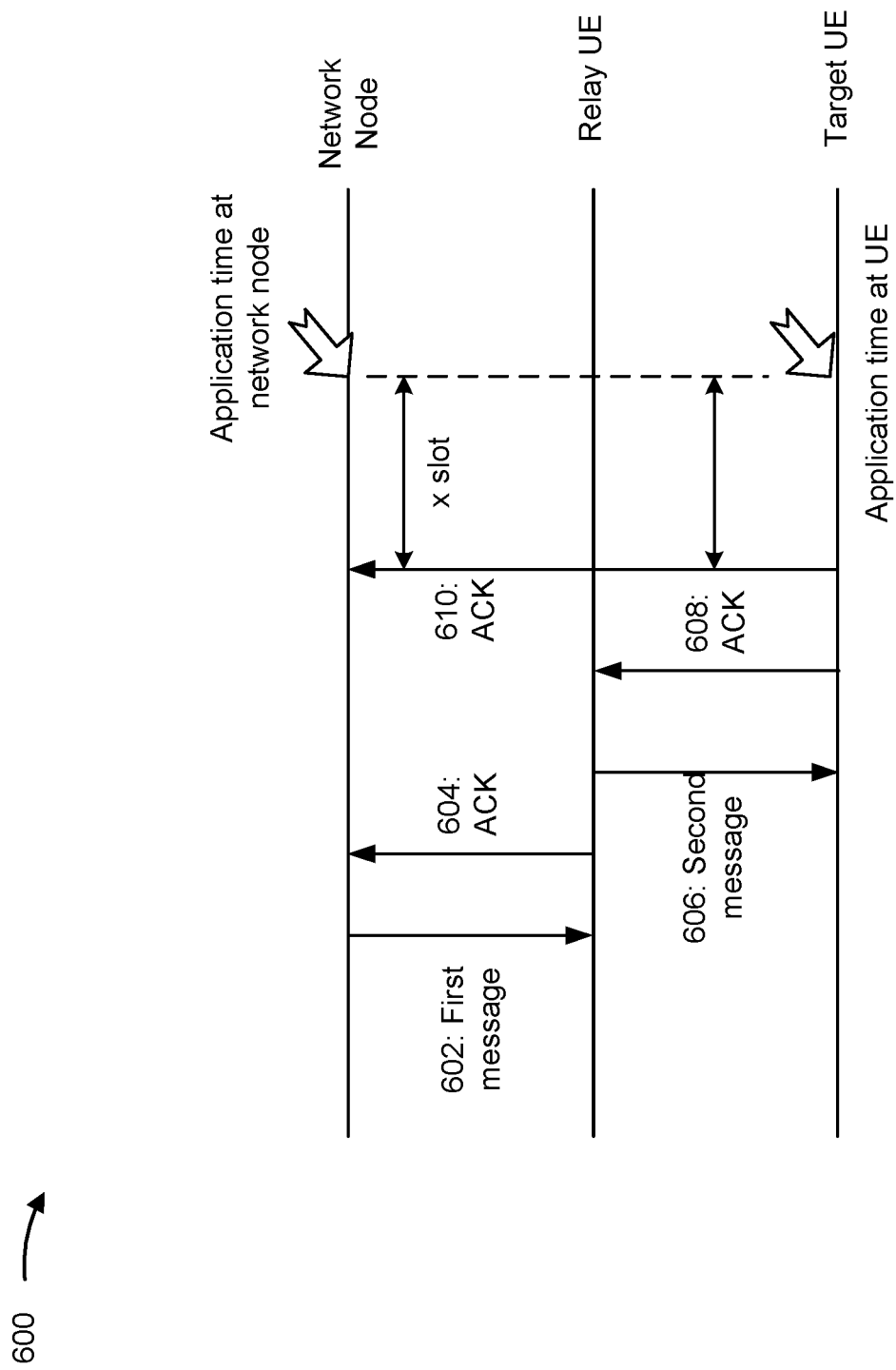

FIG. 6 is a diagram illustrating an example 600 associated with relaying beam switching information, in accordance with the present disclosure. As shown in FIG. 6, example 600 includes communication between a relay UE (e.g., UE 120a), a target UE (e.g., UE 120e), and a network node (e.g., network node 110). In some aspects, the relay UE, the target UE, and the network node may be included in a wireless network, such as wireless network 100.

As shown by reference number 602, the network node may transmit a first message to the relay UE. The first message may indicate beam switching information for the target UE. As shown by reference number 604, the relay UE may transmit, to the network node, an ACK based at least in part on the first message being successfully received by the relay UE. As shown by reference number 606, the relay UE may transmit a second message to the target UE. The second message may indicate the beam switching information for the target UE. As shown by reference number 608, the target UE may transmit, to the relay UE, an ACK based at least in part on the second message being successfully received by the target UE. As shown by reference number 610, the target UE may transmit an ACK directly to the network node. A downlink beam switch application time at the network node and at the target UE may be x slots after the target UE transmits the ACK directly to the network node.

As indicated above, FIG. 6 is provided as an example. Other examples may differ from what is described with regard to FIG. 6.

Figure 7:
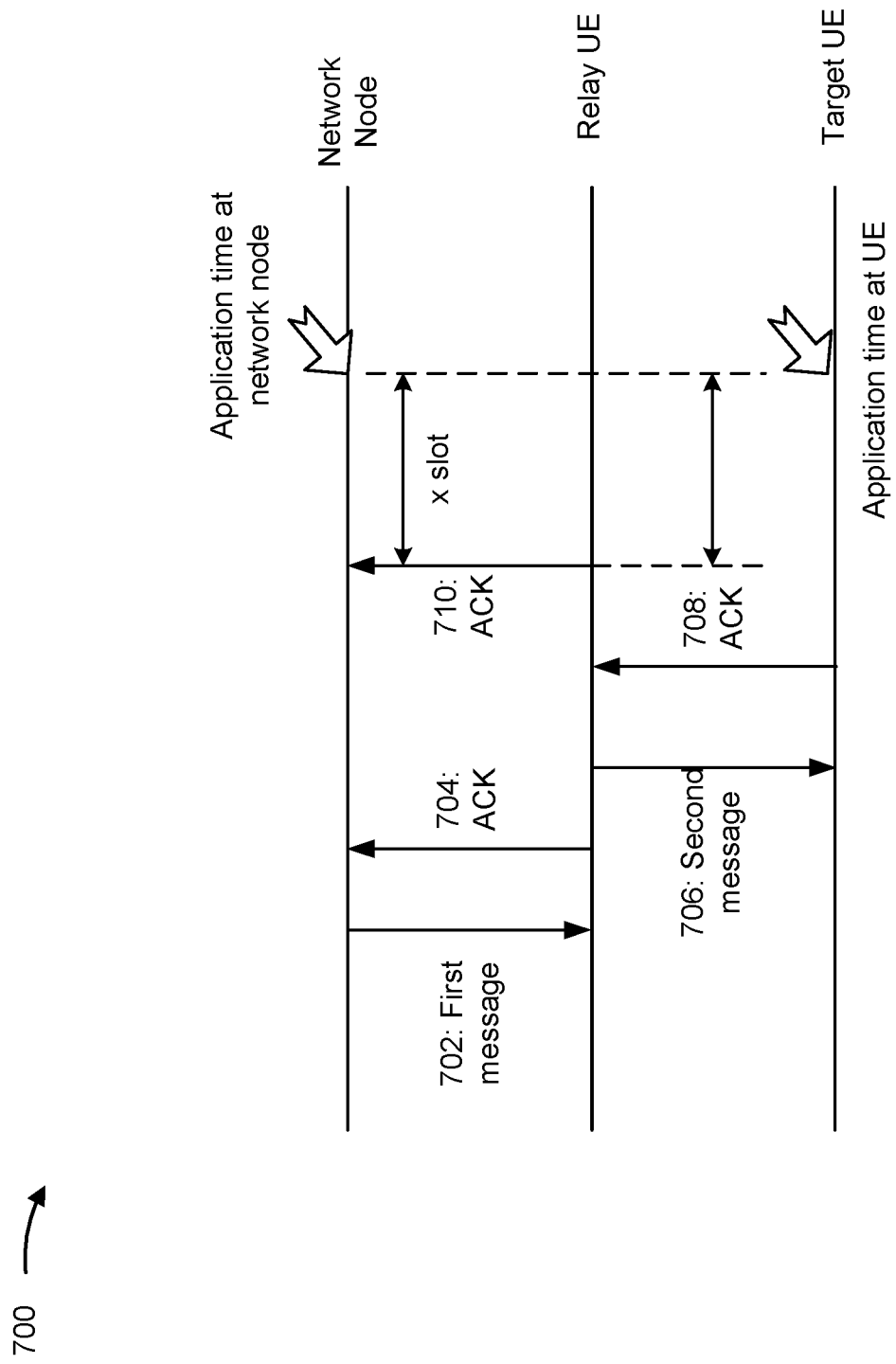

FIG. 7 is a diagram illustrating an example 700 associated with relaying beam switching information, in accordance with the present disclosure. As shown in FIG. 7, example 700 includes communication between a relay UE (e.g., UE 120a), a target UE (e.g., UE 120e), and a network node (e.g., network node 110). In some aspects, the relay UE, the target UE, and the network node may be included in a wireless network, such as wireless network 100.

As shown by reference number 702, the network node may transmit a first message to the relay UE. The first message may indicate beam switching information for the target UE. As shown by reference number 704, the relay UE may transmit, to the network node, an ACK based at least in part on the first message being successfully received by the relay UE. As shown by reference number 706, the relay UE may transmit a second message to the target UE. The second message may indicate the beam switching information for the target UE. As shown by reference number 708, the target UE may transmit, to the relay UE, an ACK based at least in part on the second message being successfully received by the target UE. As shown by reference number 710, the relay UE may forward the ACK to the network node. A downlink beam switch application time at the network node and at the target UE may be x slots after the relay UE relays or forwards the ACK to the network node.

As indicated above, FIG. 7 is provided as an example. Other examples may differ from what is described with regard to FIG. 7.

Figure 8:
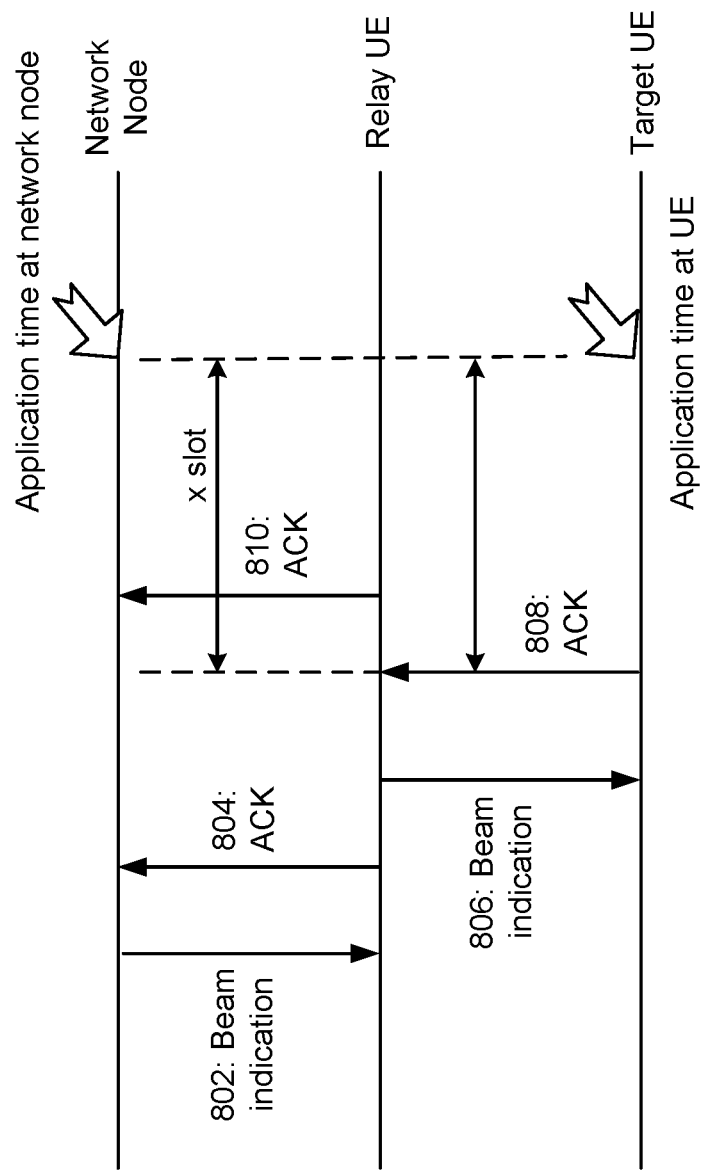

FIG. 8 is a diagram illustrating an example 800 associated with relaying beam switching information, in accordance with the present disclosure. As shown in FIG. 8, example 800 includes communication between a relay UE (e.g., UE 120*a*), a target UE (e.g., UE 120*e*), and a network node (e.g., network node 110). In some aspects, the relay UE, the target UE, and the network node may be included in a wireless network, such as wireless network 100.

In some aspects, when the target UE transmits an ACK to the network node via the relay UE, when an uplink resource for forwarding the ACK from the relay UE is not indicated to the target UE, the target UE may be unable to determine when the network node will receive the ACK. The target UE may switch to a new beam x slots after the target UE transmits the ACK to the relay UE, where the ACK may be in response to a second message transmitted from the relay UE to the target UE. The network node may determine when the second message is transmitted, and when the ACK for the second message is received at the relay UE from a sidelink configuration. The network node may then be able to determine when the target UE is going to switch to the new beam. The network node may apply the new beam at the same time as the target UE. The network node may allocate time resources for the ACK to ensure that the ACK is received before a downlink beam switch application time, such that the network node may determine that the target UE has successfully received beam switching information from the network node.

As shown by reference number 802, the network node may transmit a first message to the relay UE. The first message may indicate the beam switching information for the target UE. As shown by reference number 804, the relay UE may transmit, to the network node, an ACK based at least in part on the first message being successfully received by the relay UE. As shown by reference number 806, the relay UE may transmit a second message to the target UE. The second message may indicate the beam switching information for the target UE. As shown by reference number 808, the target UE may transmit, to the relay UE, an ACK based at least in part on the second message being successfully received by the target UE. As shown by reference number 810, the relay UE may forward the ACK to the network node. A downlink beam switch application time at the network node and at the target UE may be x slots after the target UE transmits the ACK to the relay UE.

As indicated above, FIG. 8 is provided as an example. Other examples may differ from what is described with regard to FIG. 8.

Figure 9:
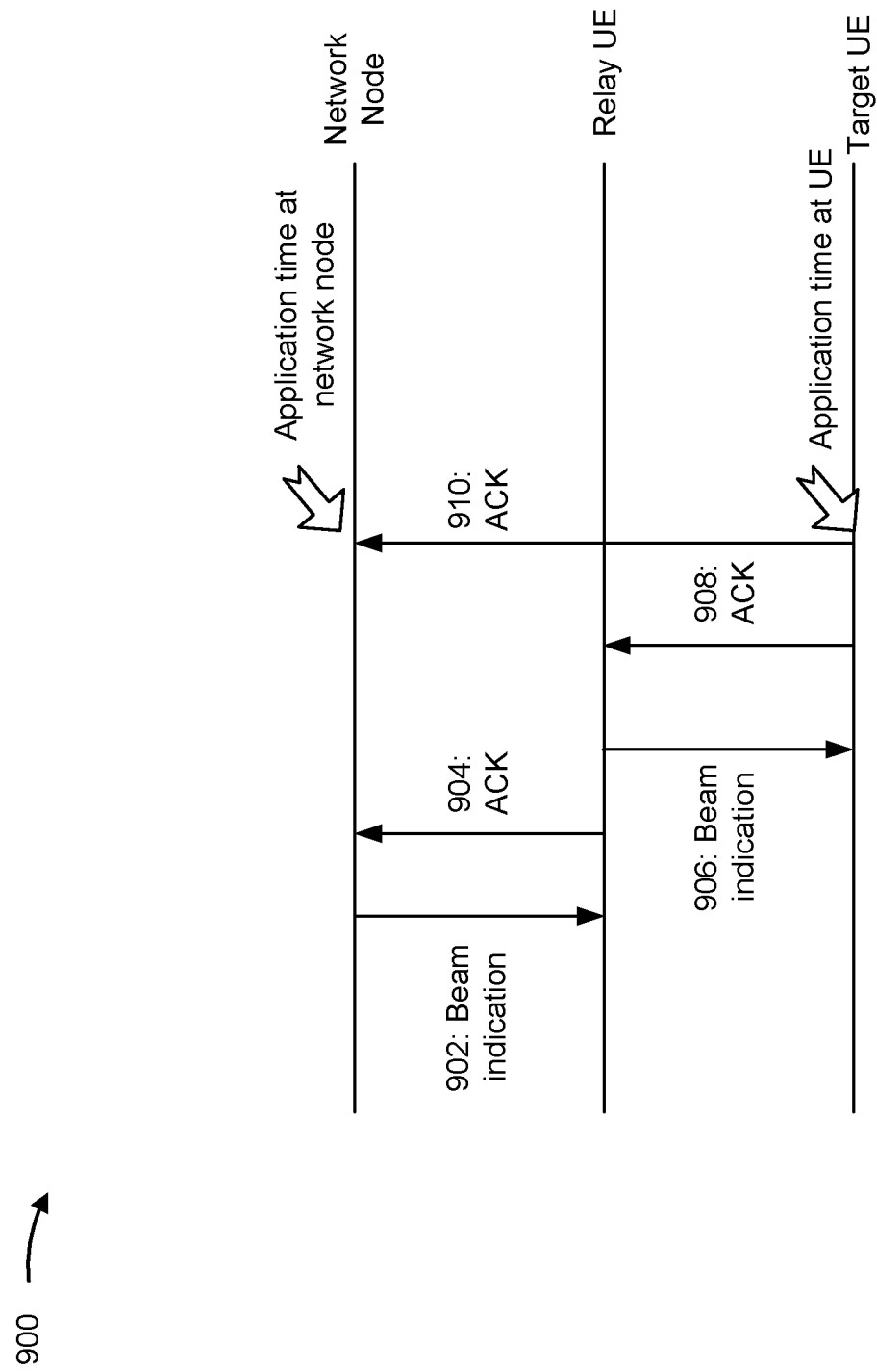

FIG. 9 is a diagram illustrating an example 900 associated with relaying beam switching information, in accordance with the present disclosure. As shown in FIG. 9, example 900 includes communication between a relay UE (e.g., UE 120*a*), a target UE (e.g., UE 120*e*), and a network node (e.g., network node 110). In some aspects, the relay UE, the target UE, and the network node may be included in a wireless network, such as wireless network 100.

In some aspects, an uplink beam may be associated with an application time. When the target UE transmits an ACK to the network node via a relay UE, an uplink beam switch application may use the same rule as a downlink beam switch application time. For example, an uplink resource for forwarding the ACK from the relay UE may or may not be known to the target UE. In other words, the uplink resource that the relay UE uses for forwarding the ACK to the network node may or may not be indicated to the target UE. When the uplink resource for forwarding the ACK is indicated to the target UE, both the network node and the target UE may determine when the network node will receive the ACK, and the uplink beam switch application time may be known at both the network node and the target UE. When the target UE transmits the ACK directly to the network node, an uplink beam switch may be indicated in a first message. The uplink beam switch application time may be associated with the same rule as the downlink beam switch application time when a current uplink beam is working. The uplink beam switch application time may be the time at which the target UE transmits the ACK when the current uplink beam is working or is not working.

As shown by reference number 902, the network node may transmit a first message to the relay UE. The first message may indicate the beam switching information for the target UE. As shown by reference number 904, the relay UE may transmit, to the network node, an ACK based at least in part on the first message being successfully received by the relay UE. As shown by reference number 906, the relay UE may transmit a second message to the target UE. The second message may indicate the beam switching information for the target UE. As shown by reference number 908, the target UE may transmit, to the relay UE, an ACK based at least in part on the second message being successfully received by the target UE. As shown by reference number 910, the target UE may transmit an ACK directly to the network node. An uplink beam switch application time at the network node and at the target UE may correspond to the time at which the target UE transmits the ACK to the network node.

As indicated above, FIG. 9 is provided as an example. Other examples may differ from what is described with regard to FIG. 9.

In some aspects, when a resource for transmitting an ACK to a network node (in a third step) is not allocated by the network node, the network node and a target UE may still use an ACK for a second message as a reference time for determining a beam switch application time. Since the ACK may not necessarily be received by the network node before the beam switch application time, additional information may be inserted in the ACK. For example, an indication of which first message this ACK is related to may be included along with the ACK.

In some aspects, a Uu TCI state activation/deactivation MAC-CE may be transmitted via a sidelink interface. When a new beam to be switched to is not in a current activated TCI state list, a first message may directly indicate a TCI state for the new beam. The first message may indicate a new activated TCI state MAC-CE, including the TCI state for the new beam, and a codepoint applied to the new activated TCI states.

In some aspects, a downlink MAC-CE may be transmitted via the sidelink interface. For an activation/deactivation MAC-CE associated with a channel state information reference signal (CSI-RS) or a sounding reference signal (SRS), the network node and the target UE may need to have a common beam application time. An ACK (in a third step) may be needed in this case. For a MAC-CE associated with a discontinuous reception (DRX) command, a long DRX command, or a timing advance (TA), the network node may assume that the target UE receives the MAC-CE. The network node may also assume that, even when the MAC-CE is not received, the target UE may not be overly affected. An ACK (in a third step) may be omitted in this case.

Figure 10:
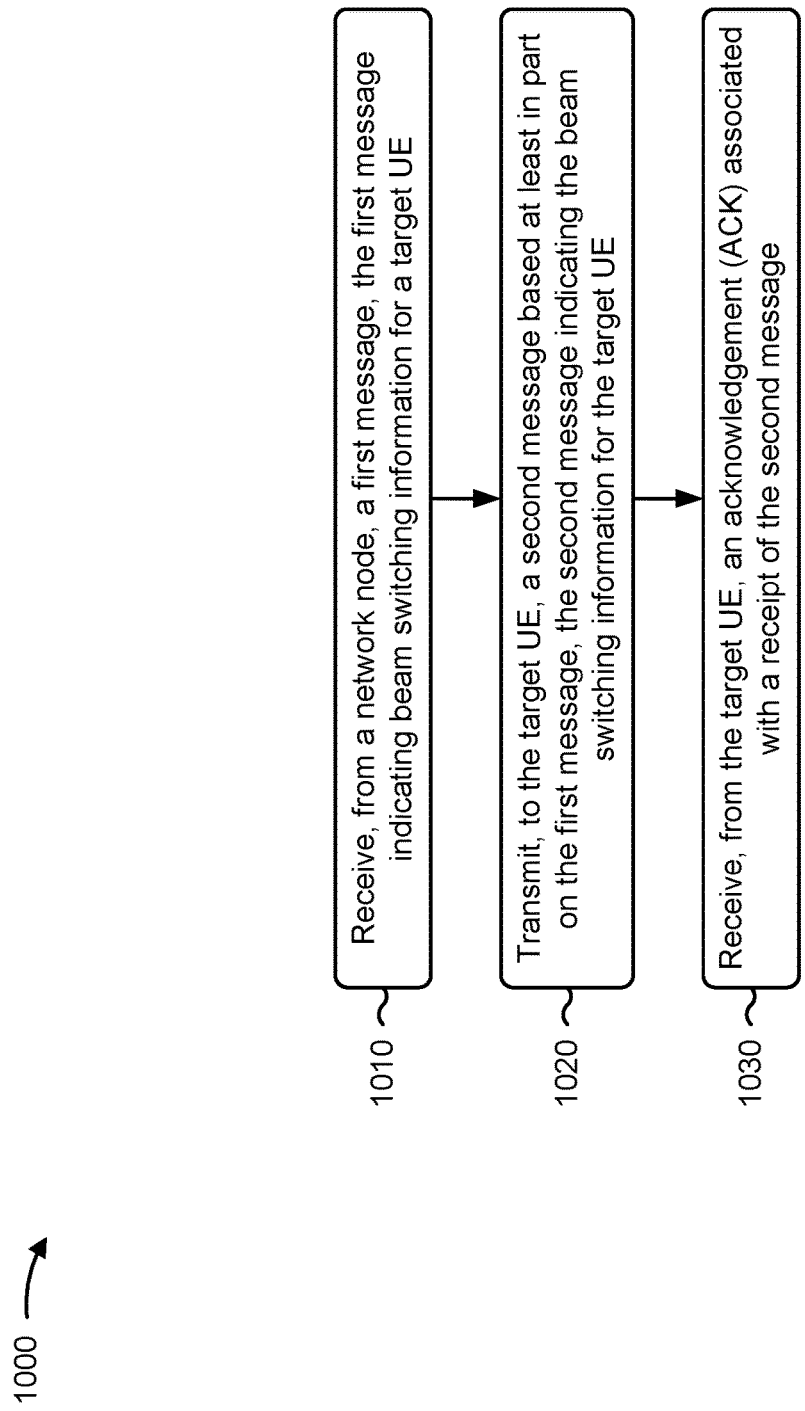
FIGS. 10-11 are diagrams illustrating example processes associated with relaying beam switching information, in accordance with the present disclosure.

FIG. 10 is a diagram illustrating an example process 1000 performed, for example, by a relay UE, in accordance with the present disclosure. Example process 1000 is an example where the relay UE (e.g., UE 120a) performs operations associated with relaying beam switching information.

As shown in FIG. 10, in some aspects, process 1000 may include receiving, from a network node, a first message, the first message indicating beam switching information for a target UE (block 1010). For example, the relay UE (e.g., using reception component 1202 and/or communication manager 1206, depicted in FIG. 12) may receive, from a network node, a first message, the first message indicating beam switching information for a target UE, as described above.

As further shown in FIG. 10, in some aspects, process 1000 may include transmitting, to the target UE, a second message based at least in part on the first message, the second message indicating the beam switching information for the target UE (block 1020). For example, the relay UE (e.g., using transmission component 1204 and/or communication manager 1206, depicted in FIG. 12) may transmit, to the target UE, a second message based at least in part on the first message, the second message indicating the beam switching information for the target UE, as described above.

As further shown in FIG. 10, in some aspects, process 1000 may include receiving, from the target UE, an ACK associated with a receipt of the second message (block 1030). For example, the relay UE (e.g., using reception component 1202 and/or communication manager 1206, depicted in FIG. 12) may receive, from the target UE, an ACK associated with a receipt of the second message, as described above.

Process 1000 may include additional aspects, such as any single aspect or any combination of aspects described below and/or in connection with one or more other processes described elsewhere herein.

In a first aspect, process 1000 includes relaying, to the network node, the ACK associated with the receipt of the second message. In a second aspect, alone or in combination with the first aspect, process 1000 includes receiving the first message via a MAC-CE or a DCI. In a third aspect, alone or in combination with one or more of the first and second aspects, process 1000 includes transmitting the second message via a sidelink MAC-CE or an SCI.

In a fourth aspect, alone or in combination with one or more of the first through third aspects, the beam switching information indicates a TCI command for beam switching, the TCI command for beam switching being associated with a DCI codepoint or a TCI state identifier, and the TCI command for beam switching being for a downlink beam or for both a downlink beam and an uplink beam. In a fifth aspect, alone or in combination with one or more of the first through fourth aspects, the first message indicates an uplink resource allocation for the ACK associated with the receipt of the second message. In a sixth aspect, alone or in combination with one or more of the first through fifth aspects, process 1000 includes receiving, from the network node, a DCI that indicates a sidelink resource allocation for transmitting the second message, the DCI indicating a destination index associated with the target UE.

In a seventh aspect, alone or in combination with one or more of the first through sixth aspects, process 1000 includes generating the second message based at least in part on the first message, wherein the first message is wrapped in a sidelink MAC-CE without changing a payload of the first message, and the payload of the first message is encoded in an SCI, based at least in part on the first message being transmitted using a MAC-CE, or the first message is encoded in a sidelink MAC-CE or an SCI, based at least in part on the first message being transmitted using a DCI.

In an eighth aspect, alone or in combination with one or more of the first through seventh aspects, the second message indicates an uplink resource to relay the ACK associated with the receipt of the second message. In a ninth aspect, alone or in combination with one or more of the first through eighth aspects, a downlink beam switch application time is a quantity of slots after the ACK associated with the receipt of the second message is relayed to the network node. In a tenth aspect, alone or in combination with one or more of the first through ninth aspects, a downlink beam switch application time is a quantity of slots after the ACK associated with the receipt of the second message is received from the target UE.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
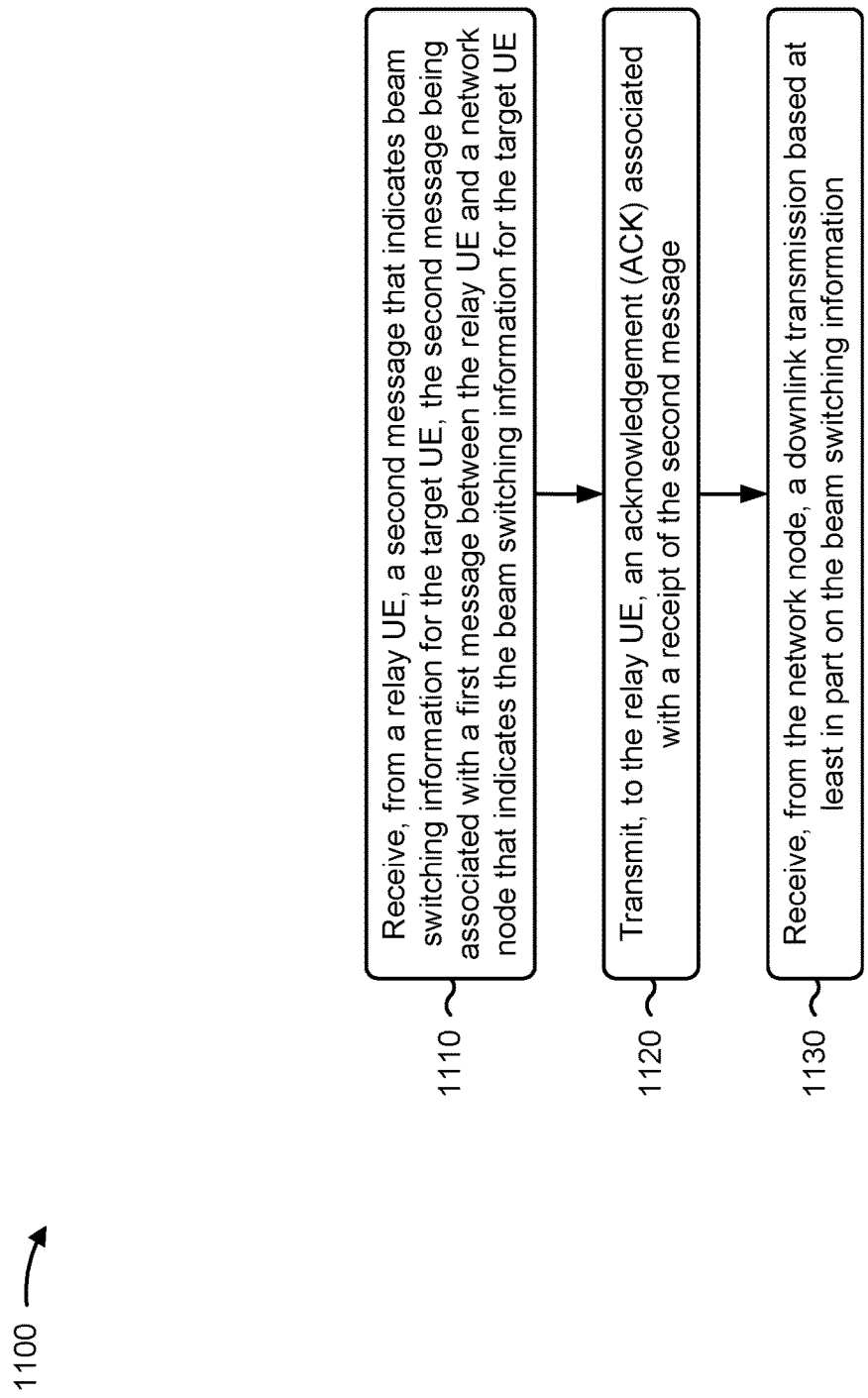

FIG. 11 is a diagram illustrating an example process 1100 performed, for example, by a target UE, in accordance with the present disclosure. Example process 1100 is an example where the target UE (e.g., UE 120e) performs operations associated with relaying beam switching information.

As shown in FIG. 11, in some aspects, process 1100 may include receiving, from a relay UE, a second message that indicates beam switching information for the target UE, the second message being associated with a first message between the relay UE and a network node that indicates the beam switching information for the target UE (block 1110). For example, the target UE (e.g., using reception component 1202 and/or communication manager 1206, depicted in FIG. 12) may receive, from a relay UE, a second message that indicates beam switching information for the target UE, the second message being associated with a first message between the relay UE and a network node that indicates the beam switching information for the target UE, as described above.

As further shown in FIG. 11, in some aspects, process 1100 may include transmitting, to the relay UE, an ACK associated with a receipt of the second message (block 1120). For example, the target UE (e.g., using transmission component 1204 and/or communication manager 1206, depicted in FIG. 12) may transmit, to the relay UE, an ACK associated with a receipt of the second message, as described above.

As further shown in FIG. 11, in some aspects, process 1100 may include receiving, from the network node, a downlink transmission based at least in part on the beam switching information (block 1130). For example, the target UE (e.g., using reception component 1202 and/or communication manager 1206, depicted in FIG. 12) may receive, from the network node, a downlink transmission based at least in part on the beam switching information, as described above.

Process 1100 may include additional aspects, such as any single aspect or any combination of aspects described below and/or in connection with one or more other processes described elsewhere herein.

In a first aspect, the ACK is a first ACK, and process 1100 includes transmitting, to the network node, a second ACK associated with the receipt of the second message. In a second aspect, alone or in combination with the first aspect, the first message does not indicate a new uplink beam, and the second ACK is transmitted using a current uplink beam. In a third aspect, alone or in combination with one or more of the first and second aspects, the first message indicates a new uplink beam, and the second ACK is transmitted using the new uplink beam or a current uplink beam.

In a fourth aspect, alone or in combination with one or more of the first through third aspects, a downlink beam switch application time is a quantity of slots after the second ACK associated with the receipt of the second message is transmitted to the network node. In a fifth aspect, alone or in combination with one or more of the first through fourth aspects, an uplink beam switch application time corresponds to a time at which the second ACK associated with the receipt of the second message is transmitted to the network node. In a sixth aspect, alone or in combination with one or more of the first through fifth aspects, process 1100 includes receiving the second message via a sidelink MAC-CE or an SCI.

In a seventh aspect, alone or in combination with one or more of the first through sixth aspects, the beam switching information indicates a TCI command for beam switching, the TCI command for beam switching being associated with a DCI codepoint or a TCI state identifier, and the TCI command for beam switching being for a downlink beam or for both a downlink beam and an uplink beam. In an eighth aspect, alone or in combination with one or more of the first through seventh aspects, the ACK is a first ACK, the first message indicates an uplink resource for transmitting a second ACK associated with the receipt of the second message, and the first message indicates a PUCCH resource indicator.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
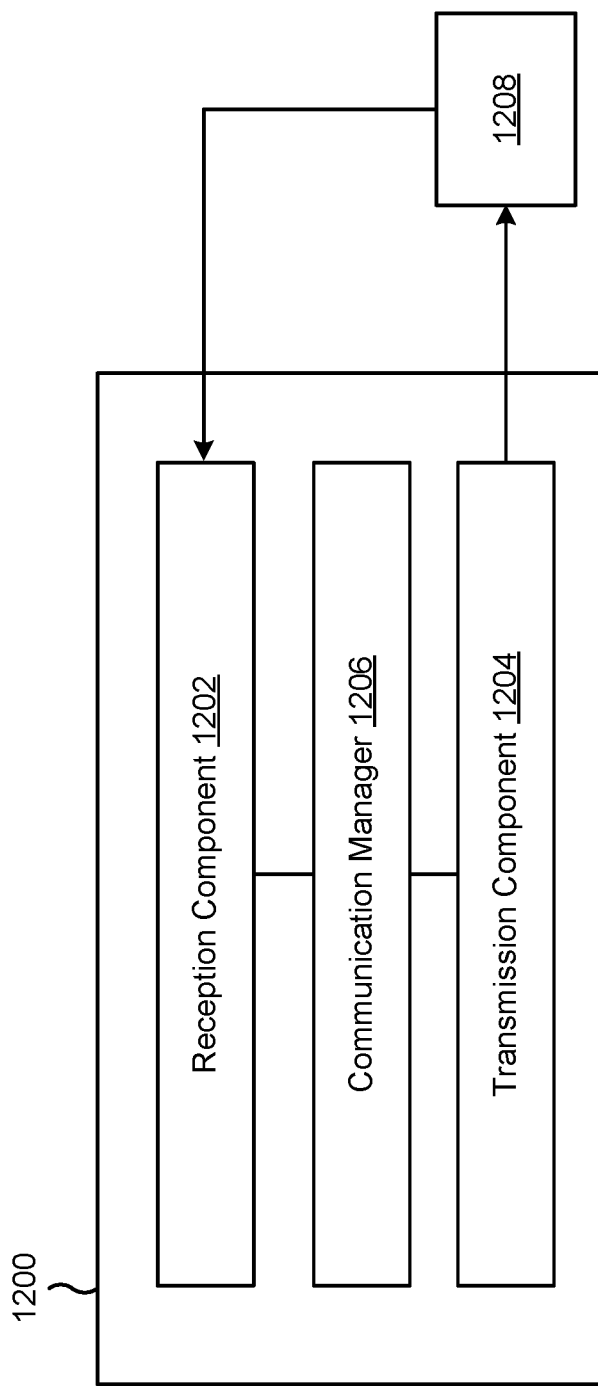
FIGS. 12-13 are diagrams of example apparatuses for wireless communication, in accordance with the present disclosure.

FIG. 12 is a diagram of an example apparatus 1200 for wireless communication, in accordance with the present disclosure. The apparatus 1200 may be a relay UE, or a relay UE may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 140 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIGS. 4-9. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the relay UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the relay UE described in connection with FIG. 2.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, a modem, a modulator, a transmit MIMO processor, a transmit processor, a controller/processor, a memory, or a combination thereof, of the relay UE described in connection with FIG. 2. In some aspects, the transmission component 1204 may be co-located with the reception component 1202 in a transceiver.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

The reception component 1202 may receive, from a network node, a first message, the first message indicating beam switching information for a target UE. The transmission component 1204 may transmit, to the target UE, a second message based at least in part on the first message, the second message indicating the beam switching information for the target UE. The reception component 1202 may receive, from the target UE, an ACK associated with a receipt of the second message. The transmission component

1204 may relay, to the network node, the ACK associated with the receipt of the second message.

The reception component 1202 may receive the first message via a MAC-CE or a DCI. The transmission component 1204 may transmit the second message via a sidelink MAC-CE or an SCI. The reception component 1202 may receive, from the network node, a DCI that indicates a sidelink resource allocation for transmitting the second message, the DCI indicating a destination index associated with the target UE. The communication manager 1206 may generate the second message based at least in part on the first message.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
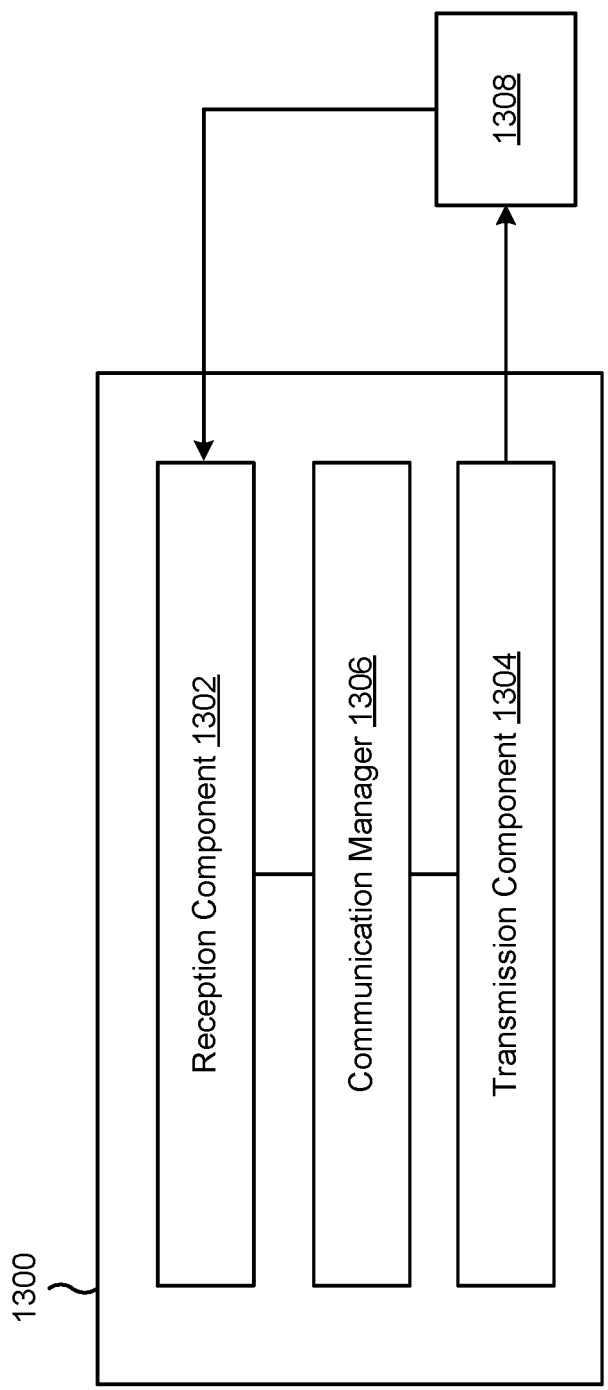

FIG. 13 is a diagram of an example apparatus 1300 for wireless communication, in accordance with the present disclosure. The apparatus 1300 may be a target UE, or a target UE may include the apparatus 1300. In some aspects, the apparatus 1300 includes a reception component 1302, a transmission component 1304, and/or a communication manager 1306, which may be in communication with one another (for example, via one or more buses and/or one or more other components). In some aspects, the communication manager 1306 is the communication manager 140 described in connection with FIG. 1. As shown, the apparatus 1300 may communicate with another apparatus 1308, such as a UE or a network node (such as a CU, a DU, an RU, or a base station), using the reception component 1302 and the transmission component 1304.

In some aspects, the apparatus 1300 may be configured to perform one or more operations described herein in connection with FIGS. 4-9. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the target UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1308. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the target UE described in connection with FIG. 2.

The transmission component 1304 may transmit communications, such as reference signals, control information, data communications, or a combination thereof, to the apparatus 1308. In some aspects, one or more other components of the apparatus 1300 may generate communications and may provide the generated communications to the transmission component 1304 for transmission to the apparatus 1308. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1308. In some aspects, the transmission component 1304 may include one or more antennas, a modem, a modulator, a transmit MIMO processor, a transmit processor, a controller/processor, a memory, or a combination thereof, of the target UE described in connection with FIG. 2. In some aspects, the transmission component 1304 may be co-located with the reception component 1302 in a transceiver.

The communication manager 1306 may support operations of the reception component 1302 and/or the transmission component 1304. For example, the communication manager 1306 may receive information associated with configuring reception of communications by the reception component 1302 and/or transmission of communications by the transmission component 1304. Additionally, or alternatively, the communication manager 1306 may generate and/or provide control information to the reception component 1302 and/or the transmission component 1304 to control reception and/or transmission of communications.

The reception component 1302 may receive, from a relay UE, a second message that indicates beam switching information for the target UE, the second message being associated with a first message between the relay UE and a network node that indicates the beam switching information for the target UE. The reception component 1302 may receive the second message via a sidelink MAC-CE or an SCI. The transmission component 1304 may transmit, to the relay UE, an ACK associated with a receipt of the second message. The reception component 1302 may receive, from the network node, a downlink transmission based at least in part on the beam switching information. The transmission component 1304 may transmit, to the network node, a second ACK associated with the receipt of the second message.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a relay user equipment (UE), comprising: receiving, from a network node, a first message, the first message indicating beam switching information for a target UE; transmitting, to the target UE, a second message based at least in part on the first message, the second message indicating the beam switching information for the target UE; and receiving, from the target UE, an acknowledgement (ACK) associated with a receipt of the second message.

Aspect 2: The method of Aspect 1, further comprising: relaying, to the network node, the ACK associated with the receipt of the second message.

Aspect 3: The method of any of Aspects 1-2, wherein receiving the first message comprises receiving the first message via a medium access control control element or a downlink control information.

Aspect 4: The method of any of Aspects 1-3, wherein transmitting the second message comprises transmitting the second message via a sidelink medium access control control element or a sidelink control information.

Aspect 5: The method of any of Aspects 1-4, wherein the beam switching information indicates a transmission configuration indicator (TCI) command for beam switching, the TCI command for beam switching being associated with a downlink control information (DCI) codepoint or a TCI state identifier, and the TCI command for beam switching being for a downlink beam or for both a downlink beam and an uplink beam.

Aspect 6: The method of any of Aspects 1-5, wherein the first message indicates an uplink resource allocation for the ACK associated with the receipt of the second message.

Aspect 7: The method of any of Aspects 1-6, further comprising: receiving, from the network node, a downlink control information (DCI) that indicates a sidelink resource allocation for transmitting the second message, the DCI indicating a destination index associated with the target UE.

Aspect 8: The method of any of Aspects 1-7, further comprising generating the second message based at least in part on the first message, wherein: the first message is wrapped in a sidelink medium access control control element (MAC-CE) without changing a payload of the first message, and the payload of the first message is encoded in a sidelink control information (SCI), based at least in part on the first message being transmitted using a MAC-CE; or the first message is encoded in a sidelink MAC-CE or an SCI, based at least in part on the first message being transmitted using a downlink control information (DCI).

Aspect 9: The method of any of Aspects 1-8, wherein the second message indicates an uplink resource to relay the ACK associated with the receipt of the second message.

Aspect 10: The method of any of Aspects 1-9, wherein a downlink beam switch application time is a quantity of slots after the ACK associated with the receipt of the second message is relayed to the network node.

Aspect 11: The method of any of Aspects 1-10, wherein a downlink beam switch application time is a quantity of slots after the ACK associated with the receipt of the second message is received from the target UE.

Aspect 12: A method of wireless communication performed by a target user equipment (UE), comprising: receiving, from a relay UE, a second message that indicates beam switching information for the target UE, the second message being associated with a first message between the relay UE and a network node that indicates the beam switching information for the target UE; transmitting, to the relay UE, an acknowledgement (ACK) associated with a receipt of the second message; and receiving, from the network node, a downlink transmission based at least in part on the beam switching information.

Aspect 13: The method of Aspect 12, wherein the ACK is a first ACK, and further comprising: transmitting, to the network node, a second ACK associated with the receipt of the second message.

Aspect 14: The method of Aspect 13, wherein the first message does not indicate a new uplink beam, and the second ACK is transmitted using a current uplink beam.

Aspect 15: The method of Aspect 13, wherein the first message indicates a new uplink beam, and the second ACK is transmitted using the new uplink beam or a current uplink beam.

Aspect 16: The method of Aspect 13, wherein a downlink beam switch application time is a quantity of slots after the second ACK associated with the receipt of the second message is transmitted to the network node.

Aspect 17: The method of Aspect 13, wherein an uplink beam switch application time corresponds to a time at which the second ACK associated with the receipt of the second message is transmitted to the network node.

Aspect 18: The method of any of Aspects 12-17, wherein receiving the second message comprises receiving the second message via a sidelink medium access control control element or a sidelink control information.

Aspect 19: The method of any of Aspects 12-18, wherein the beam switching information indicates a transmission configuration indicator (TCI) command for beam switching, the TCI command for beam switching being associated with a downlink control information codepoint or a TCI state identifier, and the TCI command for beam switching being for a downlink beam or for both a downlink beam and an uplink beam.

Aspect 20: The method of any of Aspects 12-19, wherein the ACK is a first ACK, the first message indicating an uplink resource for transmitting a second ACK associated with the receipt of the second message, and the first message indicating a physical uplink control channel resource indicator.

Aspect 21: An apparatus for wireless communication at a device, comprising a processor; memory coupled with the processor; and instructions stored in the memory and executable by the processor to cause the apparatus to perform the method of one or more of Aspects 1-11.

Aspect 22: A device for wireless communication, comprising a memory and one or more processors coupled to the memory, the one or more processors configured to perform the method of one or more of Aspects 1-11.

Aspect 23: An apparatus for wireless communication, comprising at least one means for performing the method of one or more of Aspects 1-11.

Aspect 24: A non-transitory computer-readable medium storing code for wireless communication, the code comprising instructions executable by a processor to perform the method of one or more of Aspects 1-11.

Aspect 25: A non-transitory computer-readable medium storing a set of instructions for wireless communication, the set of instructions comprising one or more instructions that, when executed by one or more processors of a device, cause the device to perform the method of one or more of Aspects 1-11.

Aspect 26: An apparatus for wireless communication at a device, comprising a processor; memory coupled with the processor; and instructions stored in the memory and executable by the processor to cause the apparatus to perform the method of one or more of Aspects 12-20.

Aspect 27: A device for wireless communication, comprising a memory and one or more processors coupled to the memory, the one or more processors configured to perform the method of one or more of Aspects 12-20.

Aspect 28: An apparatus for wireless communication, comprising at least one means for performing the method of one or more of Aspects 12-20.

Aspect 29: A non-transitory computer-readable medium storing code for wireless communication, the code comprising instructions executable by a processor to perform the method of one or more of Aspects 12-20.

Aspect 30: A non-transitory computer-readable medium storing a set of instructions for wireless communication, the set of instructions comprising one or more instructions that, when executed by one or more processors of a device, cause the device to perform the method of one or more of Aspects 12-20.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a relay user equipment (UE), comprising:
   one or more memories; and
   one or more processors, coupled to the one or more memories, configured to:
      receive, from a network node, a first message indicating beam switching information for a target UE;
      generate a second message indicating the beam switching information for the target UE based at least in part on the first message,
         wherein the one or more processors, to generate the second message, are configured to:
            wrap the first message in a first sidelink medium access control control element (MAC-CE) without changing a payload of the first message and encode the payload of the first message in a first sidelink control information (SCI) based at least in part on the first message being received via a MAC-CE; or
            encode the first message in a second sidelink MAC-CE or a second SCI based at least in part on the first message being received via a downlink control information (DCI);
      transmit, to the target UE, the second message based at least in part on the first message; and
      receive, from the target UE, an acknowledgement (ACK) associated with a receipt of the second message.

2. The apparatus of claim 1, wherein the one or more processors are further configured to:
   relay, to the network node, the ACK associated with the receipt of the second message.

3. The apparatus of claim 1, wherein the one or more processors are configured to transmit the second message via a sidelink MAC-CE or a SCI.

4. The apparatus of claim 1, wherein the beam switching information indicates a transmission configuration indicator (TCI) command for beam switching, the TCI command for beam switching being associated with a DCI codepoint or a TCI state identifier, and the TCI command for beam switching being for a downlink beam or for both a downlink beam and an uplink beam.

5. The apparatus of claim 1, wherein the first message indicates an uplink resource allocation for the ACK associated with the receipt of the second message.

6. The apparatus of claim 1, wherein the one or more processors are further configured to:
    receive, from the network node, the DCI, wherein the DCI indicates a sidelink resource allocation for transmitting the second message, and a destination index associated with the target UE.
7. The apparatus of claim 1, wherein the second message indicates an uplink resource to relay the ACK associated with the receipt of the second message.
8. The apparatus of claim 1, wherein a downlink beam switch application time is a quantity of slots after the ACK associated with the receipt of the second message is relayed to the network node.
9. The apparatus of claim 1, wherein a downlink beam switch application time is a quantity of slots after the ACK associated with the receipt of the second message is received from the target UE.
10. An apparatus for wireless communication at a target user equipment (UE), comprising:
    one or more memories; and
    one or more processors, coupled to the one or more memories, configured to:
        receive, from a relay UE, a second message that indicates beam switching information for the target UE,
        wherein the second message is associated with a first message between the relay UE and a network node that indicates the beam switching information for the target UE, and
        wherein the second message is based on:
            the first message being wrapped in a first sidelink medium access control control element (MAC-CE) without changing a payload of the first message, and the payload of the first message being encoded in a first sidelink control information (SCI), based at least in part on the first message being associated with a MAC-CE; or
            the first message being encoded in a second sidelink MAC-CE or a second SCI, based at least in part on the first message being associated with a downlink control information (DCI);
        transmit, to the relay UE, an acknowledgement (ACK) associated with a receipt of the second message; and
        receive, from the network node, a downlink transmission based at least in part on the beam switching information.
11. The apparatus of claim 10, wherein the ACK is a first ACK, and
    wherein the one or more processors are further configured to:
        transmit, to the network node, a second ACK associated with the receipt of the second message.
12. The apparatus of claim 11, wherein the first message does not indicate a new uplink beam, and wherein the one or more processors, to transmit the second ACK, are configured to:
    transmit the second ACK using a current uplink beam.
13. The apparatus of claim 11, wherein the first message indicates a new uplink beam, and wherein the one or more processors, to transmit the second ACK, are configured to:
    transmit the second ACK using the new uplink beam or a current uplink beam.
14. The apparatus of claim 11, wherein a downlink beam switch application time is a quantity of slots after the second ACK associated with the receipt of the second message is transmitted to the network node.
15. The apparatus of claim 11, wherein an uplink beam switch application time corresponds to a time at which the second ACK associated with the receipt of the second message is transmitted to the network node.
16. The apparatus of claim 10, wherein the one or more processors, to receive the second message, are configured to receive the second message via a sidelink MAC-CE or a SCI.
17. The apparatus of claim 12, wherein the beam switching information indicates a transmission configuration indicator (TCI) command for beam switching, the TCI command for beam switching being associated with a DCI codepoint or a TCI state identifier, and the TCI command for beam switching being for a downlink beam or for both a downlink beam and an uplink beam.
18. The apparatus of claim 11, wherein the ACK is a first ACK, the first message indicates an uplink resource for transmitting a second ACK associated with the receipt of the second message, and the first message indicates a physical uplink control channel resource indicator.
19. A method of wireless communication performed by a relay user equipment (UE), comprising:
    receiving, from a network node, the first message indicating beam switching information for a target UE;
    generating a second message indicating the beam switching information for the target UE based at least in part on the first message, wherein generating the second message comprises:
        wrapping the first message in a first sidelink medium access control control element (MAC-CE), without changing a payload of the first message, and encoding the payload of the first message in a first sidelink control information (SCI) based at least in part on the first message being received via a MAC-CE; or
        encoding the first message in a second sidelink MAC-CE or a second SCI based at least in part on the first message being received via a downlink control information (DCI);
    transmitting, to the target UE, the second message based at least in part on the first message; and
    receiving, from the target UE, an acknowledgement (ACK) associated with a receipt of the second message.
20. The method of claim 19, wherein:
    transmitting the second message comprises transmitting the second message via a sidelink MAC-CE or a SCI.
21. The method of claim 19, wherein the beam switching information indicates a transmission configuration indicator (TCI) command for beam switching, the TCI command for beam switching being associated with a DCI codepoint or a TCI state identifier, and the TCI command for beam switching being for a downlink beam or for both a downlink beam and an uplink beam.
22. The method of claim 19, wherein:
    the first message indicates an uplink resource allocation for the ACK associated with the receipt of the second message; or
    the second message indicates an uplink resource to relay the ACK associated with the receipt of the second message.
23. The method of claim 19, further comprising:
    receiving, from the network node, that the DCI, wherein the DCI indicates a sidelink resource allocation for transmitting the second message and a destination index associated with the target UE.

24. The method of claim 19, wherein:
a downlink beam switch application time is a quantity of slots after the ACK associated with the receipt of the second message is relayed to the network node; or
a downlink beam switch application time is a quantity of slots after the ACK associated with the receipt of the second message is received from the target UE.

25. The method of claim 19, further comprising:
relaying, to the network node, the ACK associated with the receipt of the second message.

26. A method of wireless communication performed by a target user equipment (UE), comprising:
receiving, from a relay UE, a second message that indicates beam switching information for the target UE, wherein the second message is associated with a first message between the relay UE and a network node that indicates the beam switching information for the target UE, and
wherein the second message is based on:
the first message being wrapped in a first sidelink medium access control control element (MAC-CE) without changing a payload of the first message and the payload of the first message being encoded in a first sidelink control information (SCI) based at least in part on the first message being associated with a MAC-CE; or
the first message being encoded in a second sidelink MAC-CE or a second SCI based at least in part on the first message being associated with a downlink control information (DCI);
transmitting, to the relay UE, an acknowledgement (ACK) associated with a receipt of the second message; and
receiving, from the network node, a downlink transmission based at least in part on the beam switching information.

27. The method of claim 26, wherein the ACK is a first ACK, and
wherein the method further comprises:
transmitting, to the network node, a second ACK associated with the receipt of the second message.

28. The method of claim 27, wherein a downlink beam switch application time is a quantity of slots after the second ACK associated with the receipt of the second message is transmitted to the network node.

29. The method of claim 27, wherein an uplink beam switch application time corresponds to a time at which the second ACK associated with the receipt of the second message is transmitted to the network node.

30. The method of claim 26, wherein the beam switching information indicates a transmission configuration indicator (TCI) command for beam switching, the TCI command for beam switching being associated with a DCI codepoint or a TCI state identifier, and the TCI command for beam switching being for a downlink beam or for both a downlink beam and an uplink beam.

* * * * *